(12) United States Patent
Svensson

(10) Patent No.: US 6,324,988 B1
(45) Date of Patent: Dec. 4, 2001

(54) DEVICE AT RAILS FOR EXHAUST EXTRACTION DEVICES

(75) Inventor: Jan Roland Svensson, Landskrona (SE)

(73) Assignee: A.B. Ph. Nederman & Co., Helsingborg (SE)

(*) Notice: Subject to any disclaimer, the term of this patent is extended or adjusted under 35 U.S.C. 154(b) by 0 days.

(21) Appl. No.: 09/552,609

(22) Filed: Apr. 19, 2000

(30) Foreign Application Priority Data

May 4, 1999 (SE) .................................... 9901594

(51) Int. Cl.⁷ ........................................ F16B 7/00
(52) U.S. Cl. ..................... 104/89; 104/95; 248/317; 403/292
(58) Field of Search .................... 104/89, 93, 94, 104/95, 111; 105/150, 154, 155; 238/176, 179; 285/330, 332, 389, 394, 397, 404; 403/286, 292, 294, 297, 298, 300; 198/860.2; 248/317, 340

(56) References Cited

U.S. PATENT DOCUMENTS

| | | | |
|---|---|---|---|
| 1,591,973 | * 7/1926 | Grossheim | 248/317 |
| 2,997,317 | * 8/1961 | Scott | 285/397 |
| 3,822,101 | * 7/1974 | Schneider | 403/297 |
| 3,987,877 | * 10/1976 | Bulanchuk | 104/94 |
| 5,203,135 | * 4/1993 | Bastian | 403/297 |

FOREIGN PATENT DOCUMENTS

| | | |
|---|---|---|
| 0095817 | 7/1986 | (EP) . |
| 0895817A2 | 2/1999 | (EP) . |

* cited by examiner

*Primary Examiner*—Mark T. Le.
(74) *Attorney, Agent, or Firm*—Tarolli, Sundheim, Covell, Tummino & Szabo L.L.P.

(57) ABSTRACT

The present invention relates to a device at rails for exhaust extraction devices, which are adapted for removal of exhausts from vehicles. The rail (2) consists of several rail members (5) which are put together or assembled by means of coupling elements (6). The coupling elements (6) are wedge-shaped and the shape of spaces (9) in rail members (5) for the coupling elements (6) corresponds with the wedge-shape of said coupling elements (6). Mounting means (10) are provided for downward movement (arrow A) relative to the rail members (5) and thereby, for pulling the coupling elements (6) upwards (arrow D) relative to said rail members (5) such that said coupling elements (6) and rail members (5) are secured by wedge to each other.

14 Claims, 3 Drawing Sheets

DEVICE AT RAILS FOR EXHAUST EXTRACTION DEVICES

TECHNICAL FIELD

The present invention relates to a device at rails for exhaust extraction devices which are adapted for removal of exhausts from vehicles, said rail being mounted in premises in which the vehicle is located when the exhausts therefrom shall be removed, wherein a carriage is provided on the rail for movement along said rail when the vehicle moves therealong, wherein a hose is provided on the carriage for feeding exhausts from the exhaust pipe of the vehicle out of said premises and wherein the rail consists of several rail members which are put together or assembled by means of coupling elements.

BACKGROUND OF THE INVENTION

Devices of the abovementioned type are already known from the publication EP 0 895 817. This device normally operates satisfactory, but it has been noticed that the rail members and coupling elements which hold said members together can loosen from each other because of the movements and loads the rails are subjected to by the carriage when said carriage runs along said rails.

SUMMARY OF THE INVENTION

The object of the present invention is to eliminate this problem by simple means and this is arrived at according to the invention.

The invention is an apparatus for removing exhaust from vehicles. The apparatus includes a plurality of rail members which extend linearly. At least one wedge-shaped coupling element extends linearly and is for coupling together the rail members. Each of the rail members has a lower portion and an upper portion. The upper portion defines a wedge-shaped receiving space for receiving the at least one wedge-shaped coupling element. The shape of the wedge-shaped receiving space corresponds to the shape of the at least one wedge-shaped coupling element. Mounting means are for mounting the at least one wedge-shaped coupling element to the rail members. The mounting means are movable in a first direction relative to each of the rail members to pull the at least one wedge-shaped coupling element in a direction opposite the first direction relative to the rail members to wedge together the wedge-shaped coupling element and the rail members. A carriage is suspended on the lower portion of the coupled together rail members for movement along the lower portion of the rail members when the vehicle moves therealong. A hose is connected to the carriage for feeding exhaust from the vehicle.

DESCRIPTION OF THE INVENTION

The device 1 illustrated in the drawings is provided in premises, e.g. a fire station, and it is intended to remove exhausts from vehicles (not shown), e.g. fire-fighting vehicles, located in said premises. The device 1 comprises a rail 2 which is suspended from the ceiling in the premises.

By providing the initially defined device with said characterizing features, the rail members and coupling elements are wedged up to each other and the wedge function improves with increased tightening of the mounting screws. The wedge function also improves with increased loading of the rails by the carriage.

BRIEF DESCRIPTION OF THE DRAWINGS

The invention will be further described below with reference to the accompanying drawings in which FIG. 1 with an exploded view illustrates the various members forming part of the device according to the invention.

DESCRIPTION OF THE INVENTION

Figure 1:
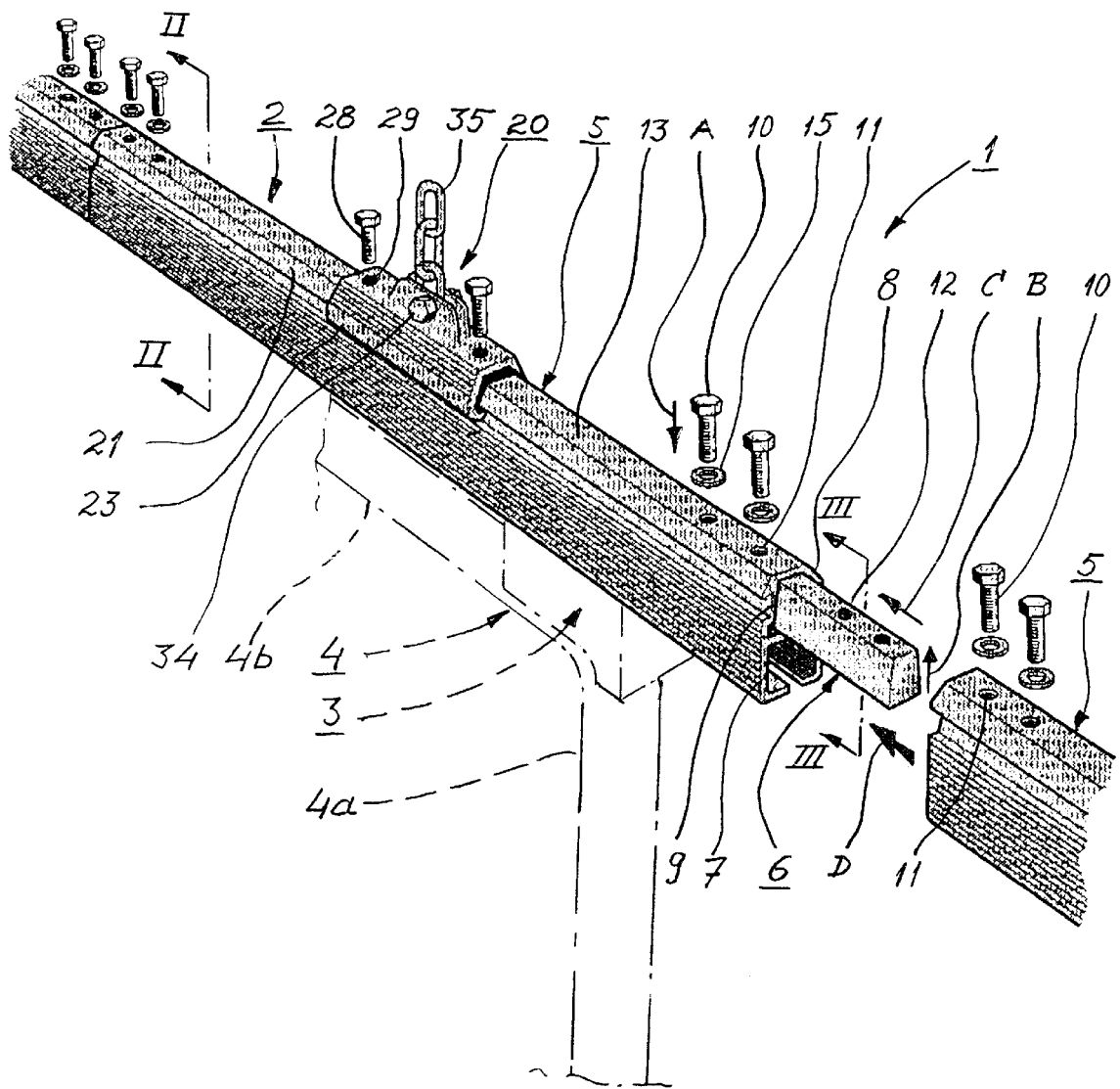

The device 1 illustrates in the drawings is provided in premises, e.g. a fire station, and it is intended to remove exhaust from vehicles (not shown), e.g. fire-fighting vehicles located in said premises. The device 1 comprises a rail 2 which is suspended from the ceiling in the premises.

The device 1 illustrated in the drawings is provided in premises, e.g. a fire station, and it is intended to remove exhausts from vehicles (not shown), e.g. fire-fighting vehicles, located in said premises. The device 1 comprises a rail 2 which is suspended from the ceiling in the premises.

The rail 2 is mounted in parallel with a driveway along which the vehicle can be driven in the premises between a parking place and a gate through which the vehicle can drive into and out of said premises. On the rail 2 there is provided a carriage 3 (schematically shown with broken lines) which is moved along the rail 2 when the vehicle moves thereal-ong. The carriage 3 includes a hose 4 for removing exhausts from the vehicle and this hose 4 has a portion 4a depending from the carriage 3 and positionable in relation to the exhaust pipe of the vehicle such that exhausts discharged from the exhaust pipe can be removed from the premises through the hose 4. The hose 4 further comprises a portion 4b which communicates with its suspended portion 4a and which is connected to the carriage 3. The portion 4b is suspended on the rail 2 through suspension means (not shown) and it is preferably connected to a fan system (not shown) generating a negative pressure in the hose 4 for facilitating removal of the exhausts.

Rail members 5 have lower portions 7 from which the carriage 3 is suspended and upper portions 8 defining spaces 9 into which coupling elements 6 are insertable. The coupling elements 6 are provided on the rail members 5 by means of mounting means 10.

In order to obtain a stable and durable connection between the rail members 5, the coupling elements 6 are wedge-shaped and the shape of the spaces 9 in the upper portions 8 of the rail members 5 correspond with the wedge-shape of said coupling elements 6. Additionally, the mounting means 10 extend downwards through upper holes 11 in the upper portions 8 of the rail members 5 and said mounting means engage holes 12 in the coupling elements 6. By moving the mounting means 10 in downwards direction (arrow A, FIG. 1) relative to the coupling elements 6, said coupling elements are pulled upwards (arrow B) relative to the rail members 5 such that said coupling elements 6 and the upper portions 8 of said rail members 5 are secured by wedge to each other.

The mounting means 10 preferably consist of mounting screws which extend downwards through holes 11 in an upper part 13 of the upper portions 8 and which are screwed down into threaded parts of the coupling elements 6, e.g. into threaded holes 12. Alternatively, the holes may be untapped and the mounting screws 10 instead screwed into a nut (not shown) provided on the coupling elements 6, e.g.

in a pocket therefor at the undersides of the coupling elements 6. Each rail member 5 may have two such mounting screws 10 for each coupling element 6 and there may be at least one washer 15 for every mounting screw 10. Said upper part 13 is oriented preferably in horizontal or substantially horizontal direction.

Figure 2:
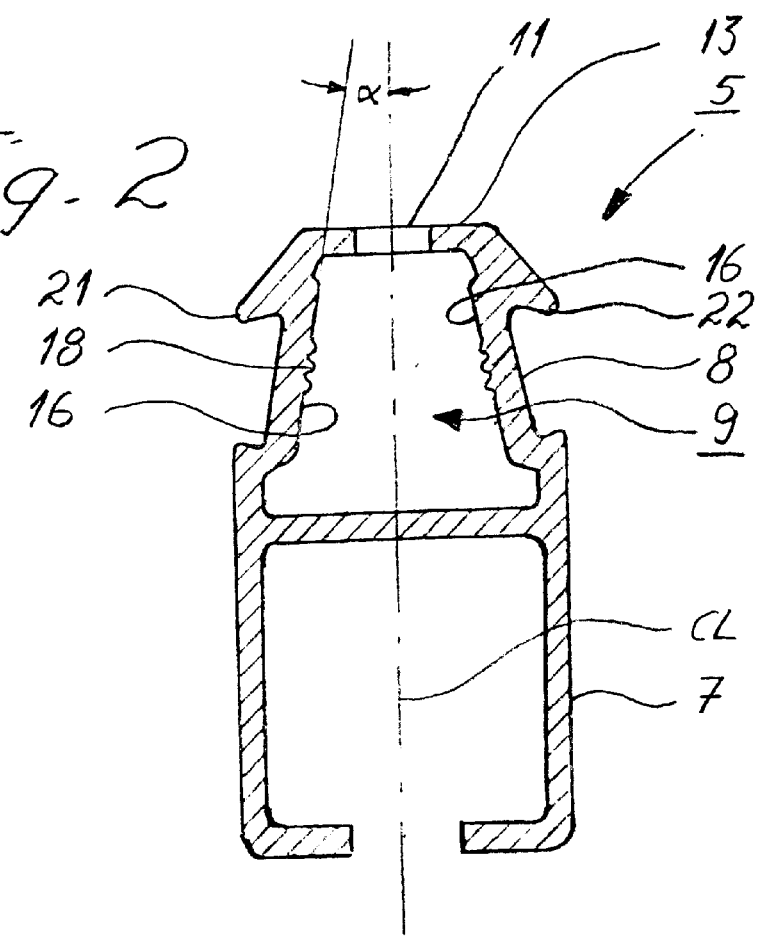
FIG. 2 is a section II—II through a member forming part of the device of FIG. 1.
Figure 3:
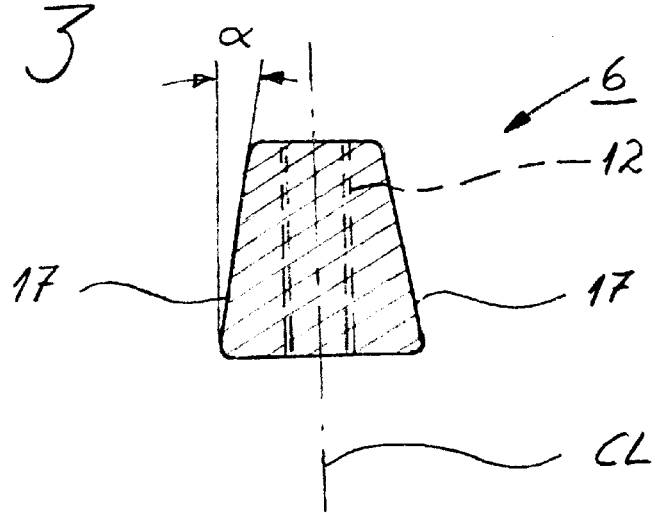
FIG. 3 is a section III—III through another member forming part of the device of FIG. 1.
Figure 4:
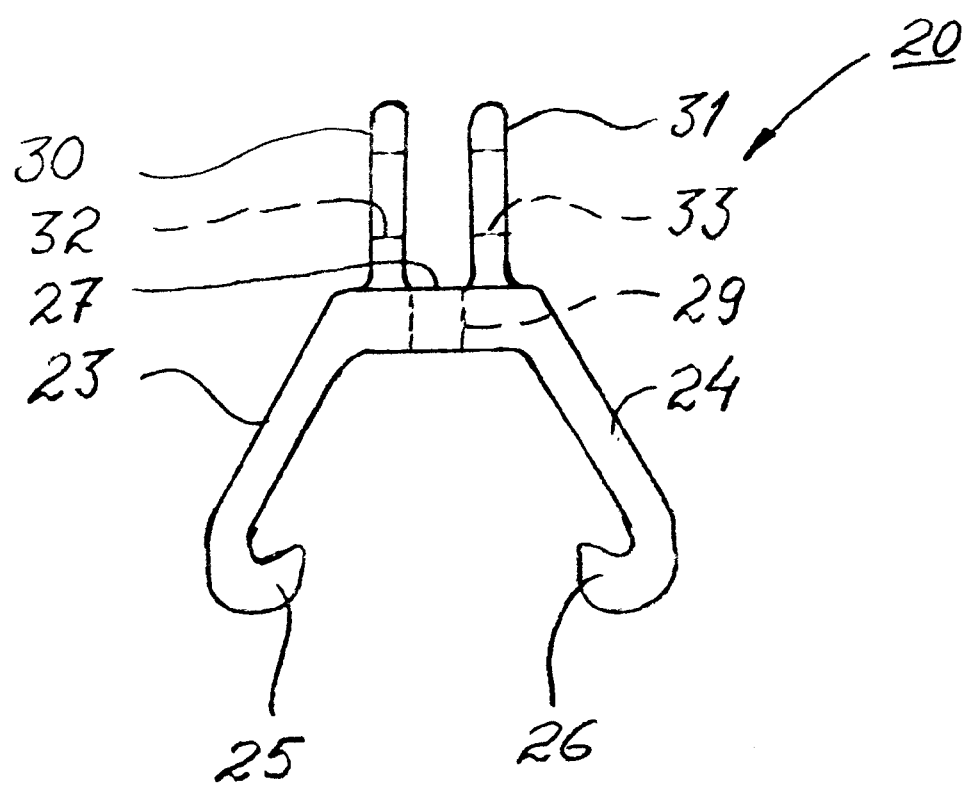
FIG. 4 is an end view of a third member forming part of the device according to the invention.

In order to maintain the obtained wedge function between the rail members 5 and the coupling elements 6 unchanged for a long time, wedge surfaces 16 (see FIG. 2) on the upper portions 8 (see FIG. 3) of the rail members 5 may comprise ridges 18 which extend in a transverse direction relative to the direction (arrow B) in which the coupling elements 6 are pulled upwards in relation to the rail members 5. These ridges 18 may be flexible in upwards direction by the coupling elements 6 when said elements are tightened. The coupling elements 6 may have smooth wedge surfaces 17 which cooperate with said ridges 18.

The wedge surfaces 16 of the rail members 5 and/or the wedge surfaces 17 of the coupling elements 6 are provided with an angle α a of 5–20°, preferably about 10°, relative to a vertical centre line CL through the rail members 5 and coupling elements 6 respectively. As is apparent from FIG. 3, the coupling elements 6 may have a trapezoidal cross section.

The rail members 5 and/or the coupling elements 6 preferably consist of extruded aluminium, but may of course consist of another suitable material.

The rail members 5 are suspended in the premises by means of suspension means 20. For enabling mounting of suspension means 20 on the rail members 5, said members are provided with, on opposite sides thereof, outwardly directed mounting flanges 21, 22 which extend in horizontal direction along the entire rail member 5 in question. The suspension means 20 have two shanks 23, 24 which extend downwards past the outwardly directed mounting flanges 21, 22. The shanks 23, 24 have, down below, inwardly directed gripping portions 25, 26 which engage said mounting flanges 21, 22 from below.

The suspension means 20 further comprise connecting portions 27 between the shanks 23, 24, said connecting portions 27 being provided at such height above the gripping portions 25, 26 that they run clear off the mounting means 10 on the rail members 5 when the suspension means 20 are threaded onto the rail members 5 through their end portions The suspension means 20 have at least one fixing means 28 for fixing thereof in any optional location on the rail members 5. The fixing means 28 may be fixing screws which are screwed into threaded holes 29 in the suspension means 20 and which with end portions engage the rail members 5 from above such that the suspension means 20 are braced or fastened thereto in suitable positions.

The suspension means 20 may also have two upwardly directed flanges 30, 31 with holes 32, 33 for a mounting member 34, e.g. a bolt. The mounting member 34, which extends through said holes 32, 33, is connected to a chain 35 or corresponding member through which the suspension means 20 is suspended in a suitable spot.

The suspension means 20 preferably consist of extruded aluminium, but may of course be made of another material.

The rail 2 can be assembled by inserting a part of a coupling element 6 into the space 9 therefor (arrow C, FIG. 1) and then secure said coupling element by wedge to the rail member 5 through the mounting means 10. Thereafter, another rail member 5 is threaded onto the protruding part of the coupling element 6 (arrow D, FIG. 1), whereupon said coupling element 6 and the other rail member 5 are secured by wedge to each other through the mounting means 10. This method of mounting or assembly continues until the rail 2 is finished in its entire length.

The invention is not limited to what is described above and illustrated in the drawings, but may vary within the scope of the subsequent claims. Thus, the rail members 5, coupling elements 6 and mounting means 10 may e.g. be designed in other ways than shown and described.

What is claimed is:

1. Apparatus for removing exhaust from vehicles comprising:
    a plurality of rail members (5) which extend linearly;
    at least one wedge-shaped coupling element (6) which extends linearly for coupling together said rail members (5);
    each of said rail members (5) having a lower portion (7) and an upper portion (8), said upper portion (8) defining a wedge-shaped receiving space (9) for receiving said at least one wedge-shaped coupling element (6), the shape of said wedge-shaped receiving space (9) corresponding to the shape of said at least one wedge-shaped coupling element (6);
    mounting means (10) for mounting said at least one wedge-shaped coupling element (6) to said rail members (5);
    said mounting means (10) being movable in a first direction relative to each of said rail members (5) to pull said at least one wedge-shaped coupling element (6) in a direction opposite said first direction relative to said rail members (5) to wedge together said wedge-shaped coupling element (6) and said rail members (5);
    a carriage (3) suspended on said lower portion (7) of said coupled together rail members (5) for movement along said lower portion (7) of said rail members (5) when the vehicle moves therealong; and
    a hose (4) connected to said carriage (3) for feeding exhaust from the vehicle;
    said rail members (5) having wedge surfaces (16) with ridges (18) which extend in a transverse direction relative to said direction opposite said first direction in which coupling elements (6) are pulled,
    said ridges (18) being flexible in said direction opposite said first direction by said coupling elements (6) when said coupling elements are pulled in said direction opposite said first direction by said mounting means (10).

2. Apparatus for removing exhaust from vehicles comprising:
    a plurality of rail members (5) which extend linearly;
    at least one wedge-shaped coupling element (6) which extends linearly for coupling together said rail members (5);
    each of said rail members (5) having a lower portion (7) and an upper portion (8), said upper portion (8) defining a wedge-shaped receiving space (9) for receiving said at least one wedge-shaped coupling element (6), the shape of said wedge-shaped receiving space (9) corresponding to the shape of said at least one wedge-shaped coupling element (6);
    mounting means (10) for mounting said at least one wedge-shaped coupling element (6) to said rail members (5);
    said mounting means (10) being movable in a first direction relative to each of said rail members (5) to pull said at least one wedge-shaped coupling element (6) in a direction opposite said first direction relative to said rail members (5) to wedge together said wedge-shaped coupling element (6) and said rail members (5);

a carriage (3) suspended on said lower portion (7) of said coupled together rail members (5) for movement along said lower portion (7) of said rail members (5) when the vehicle moves therealong; and a hose (4) connected to said carriage (3) for feeding exhaust from the vehicle.

3. Apparatus according to claim 2, wherein said mounting means (10) are mounting screws which extend in said first direction through holes (11) in an upper part (13) of said upper portions (8) of said rail members (5) and which are screwed into threaded holes (12) in or on parts of said coupling elements (6).

4. Apparatus according to claim 3, wherein said upper part (13) of said upper portions (8) of said rail members (5) is oriented in horizontal or substantially horizontal direction.

5. Apparatus according to claim 2, wherein said coupling elements (6) have wedge surfaces (17) and said rail members (5) have wedge surfaces (16), said wedge surfaces (16) and (17) are located at an angle ($\alpha$) of 5–20° relative to a vertical center line (CL) through said rail members (5) and coupling elements (6) respectively.

6. Apparatus according to claim 2, wherein said coupling elements (6) have a trapezoidal cross section.

7. Apparatus according to claim 2, wherein said rail members (5) and/or said coupling elements (6) consist of extruded aluminum.

8. Apparatus according to claim 2, wherein said rail members (5) are suspended by means of suspension means (20), said upper portions (8) of said rail members (5) are provided with outwardly directed mounting flanges (21, 22) on opposite sides thereof, said suspension means (20) has two shanks (23, 24) which extend downwards past said outwardly directed mounting flanges (21, 22) and which include inwardly directed gripping portions (25, 26) which engage said mounting flanges (21, 22) from below.

9. Apparatus according to claim 8, wherein said mounting flanges (21, 22) on said rail members (5) are provided to extend along said coupled together rail members (5), said suspension means (20) includes connecting portions (27) between said shanks (23, 24), said connecting portions (27) being located at a height above said gripping portions (25, 26) clear off said mounting means (10) on said rail members (5) when said suspension means (20) are threaded onto said rail members (5) through their end portions.

10. Apparatus according to claim 8, wherein said suspension means (20) includes at least one fixing means (28) for fixing thereof in any optional location along said rail members (5).

11. Apparatus according to claim 10, wherein said fixing means (28) is a fixing screw which with an end portion engages said rail member (5) from above.

12. Apparatus according to claim 11, wherein said fixing screw (28) is screwed through a threaded hole (29) in said suspension means (20) such that said screw secures said suspension means (20) in a suitable position at said rail member (5).

13. Apparatus according to claim 8, wherein said suspension means (20) has two upwardly directed flanges (30, 31) with holes (32, 33) for a mounting member (34), said mounting member (34) extends through said holes (32, 33) and is connected to a chain (35) or corresponding member through which said suspension means (20) is suspended.

14. Apparatus according to claim 8, wherein said suspension means (20) consists of extruded aluminum.

* * * * *